United States Patent [19]

Osswald et al.

[11] Patent Number: 5,319,971
[45] Date of Patent: Jun. 14, 1994

[54] MEASURING ELEMENT FOR DETERMINING A FLOW RATE OF A FLOWING MEDIUM

[75] Inventors: Bernd Osswald, Stuttgart; Thomas Schwegel, Vaihingen/Enz; Martin Winter, Stuttgart, all of Fed. Rep. of Germany

[73] Assignee: Robert Bosch GmbH, Stuttgart, Fed. Rep. of Germany

[21] Appl. No.: 910,374

[22] Filed: Jul. 8, 1992

[30] Foreign Application Priority Data

Jul. 19, 1991 [DE] Fed. Rep. of Germany ....... 4124032

[51] Int. Cl.⁵ .............................................. G01F 1/68
[52] U.S. Cl. ................................................. 73/204.26
[58] Field of Search ........... 73/204.26, 204.16, 204.23, 73/204.25, 118.2

[56] References Cited

U.S. PATENT DOCUMENTS

| | | | |
|---|---|---|---|
| 4,594,889 | 6/1986 | McCarthy | 73/204.26 |
| 4,777,820 | 10/1988 | Hecht et al. | 73/204.26 |
| 4,783,996 | 11/1988 | Ohta et al. | 73/204.26 |
| 4,803,875 | 2/1989 | Kuhn et al. | 73/204.26 |
| 4,976,145 | 12/1990 | Kienzle et al. | 73/204.26 |

FOREIGN PATENT DOCUMENTS 3638738  5/1988  Fed. Rep. of Germany .

*Primary Examiner*—Richard E. Chilcot, Jr.
*Assistant Examiner*—Harshad Patel
*Attorney, Agent, or Firm*—Edwin E. Greigg; Ronald E. Greigg

[57] ABSTRACT

A measuring element which has been lengthening in the flow direction to provide a detachment zone which is shifted downstream from the region of the measuring resistor, so that end flow disturbances no longer affect the region of the measuring resistor, and adulteration of the measurement values is prevented. The measuring element is especially suitable for determining the throughput or flow rate of the aspirated air of mixture-compressing internal combustion engines.

3 Claims, 2 Drawing Sheets

---

MEASURING ELEMENT FOR DETERMINING A FLOW RATE OF A FLOWING MEDIUM

BACKGROUND OF THE INVENTION

The invention is based on a measuring element for a device for determining the mass or flow rate of a flowing medium, in particular the aspirated air of internal combustion engines.

In such devices, also known as hot-film air flow rate meters, the resistor tracks of a temperature sensor and a compensation resistor, on the one hand, and the resistor track of the measuring resistor on the other, together with two calibration resistors, form a Wheatstone bridge, whose bridge diagonal voltage is applied to a control amplifier. The output voltage of the control amplifier serves as the heating voltage for a heating resistor of the measuring element.

In a known measuring element for the above device, of the type referred to at the outset (German Patent Disclosure Document 36 38 138 A1), the distribution of the resistor tracks on the substrate is such that the resistor tracks are aligned parallel to one another and in succession in the flow direction. The resistor track for the compensation resistor is disposed between the resistor track for the temperature and the resistor track for the measuring resistor, on the same side of the substrate, and the resistor track for the heating resistor is disposed on the other side of the substrate, immediately opposite the resistor track for the measuring resistor. The various resistor tracks are separated from one another by means of slits in the substrate that extend crosswise to the flow direction; this provides temperature decoupling among the various resistor tracks. As a result of these separating slits, the substrate has three prongs of equal length, of which the first two prongs in the flow direction each have one resistor track, and the last prong in the flow direction has the resistor track for the measuring resistor and the heating resistor.

It has now been found that the characteristic of a measuring element of this kind has an unfavorable course in some regions, with a curvature that does not vary uniformly with an increasing flow rate of the medium. Regions of constant inclination alternate with those of variable inclination.

This characteristic is due to the trailing face located downstream, directly after the measuring resistor, at which face the flow is disturbed. A detachment region in which unsteady flow conditions prevail forms downstream of the trailing face, and this region is characterized by a stable vortex street, known as the Karman vortex street. A flow created by the negative pressure prevailing in the vortices and oscillating transversely to the main flow, leads to the aforementioned adulteration of the characteristic.

OBJECT AND SUMMARY OF THE INVENTION

The measuring element according to the invention has an advantage over the prior art that the measuring element has a characteristic with a constantly varying curvature with an increasing flow rate of the medium. By lengthening the measuring element, in the form of an additional prong that is disposed downstream of the region of the measuring resistor, the trailing face is located on the additional prong and is still farther away from the measuring resistor, by the distance of its width. The influences of the Karman vortex street no longer affect the region of the measuring resistor, so that the flow in this region proceeds virtually without disturbance.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
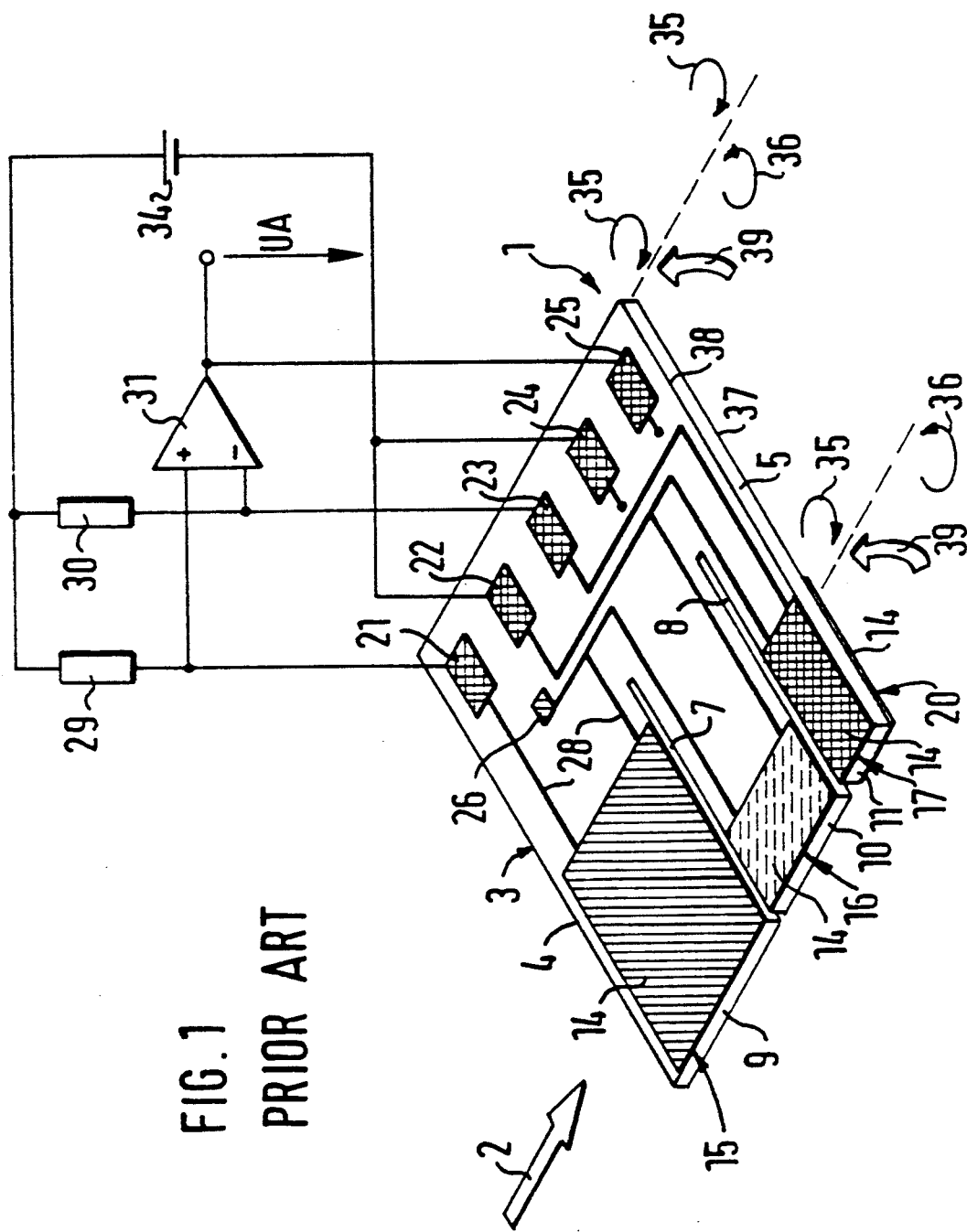
FIG. 1 shows a measuring element according to the prior art.

A hot-film air flow rate meter, which is shown in FIG. 1 as an example of a known device for determining the mass, or flow rate, of a flowing medium has a measuring element 1 that protrudes into the flowing medium, in this case air and, in the case of internal combustion engines, for instance, is disposed in an intake tube or in a bypass around it. The flow direction of the medium is indicated by an arrow 2. The measuring element 1 comprises a rectangular substrate 3, which is subdivided crosswise to the flow direction into three prongs 9, 10, 11 of equal length by two parallel slits 7, 8, which extend parallel to a leading face 4 and a trailing face 5. A resistor track 14 is disposed on each of the prongs 9, 10, 11; the first prong 9 in the flow direction carries the resistor track 14 for a temperature sensor 15; the second prong 10 carries the resistor track 14 for a compensation resistor 16; and the third prong has a resistor track 14 on the one side of its surface for a measuring resistor 17 and a resistor track 14 on the other side for a heating resistor 20. The temperature sensor 15, the compensation resistor 16 and the measuring resistor 17 are disposed on the same side of the substrate 3, while the heating resistor 20, for instance, is disposed on the opposite side. Five contact faces 21–25 are lined up, spaced apart from one another, along the long side opposite the slit long side of the measuring element 1, on the top face of the substrate 3 where the resistor tracks 14 for the temperature sensor 15, compensation resistor 16 and measuring resistor 17 are also located. The contact faces 21–25 are connected to the various resistor tracks 14 via printed conductor tracks 28; specifically, the contact face 21 is connected to the temperature sensor 15, the contact face 22 to the compensation resistor 16 and the measuring resistor 17, the contact face 23 to the measuring resistor 17, and the two contact faces 24, 25 to the heating resistor 20. A conductor track 28 also connects the temperature sensor 15 to the compensation resistor 16 and can be tapped by a contact face 26. The other circuit components of the hot-film air flow rate meter are connected to the contact faces 21–25 of the measuring element 1 as in the circuit diagram shown in FIG. 1. The series circuit of the temperature sensor 15 and the compensation resistor 16 on the one hand, and the measuring resistor 17 on the other, are located along with two resistors 29, 30 in a Wheatstone bridge circuit, whose bridge diagonal voltage is applied to a control amplifier 31 embodied as a differential amplifier. A direct voltage source 34 is used to supply power to the Wheatstone bridge circuit. The output voltage UA of the control amplifier 31 is applied to the heating resistor 20.

The function of the hot-film air flow rate meter is known per se and will be described briefly below.

By means of the output current of the control amplifier 31, heating of the heating resistor 20 occurs; the heating capacity at the heating resistor 20 is determined essentially by the bridge diagonal voltage at the control amplifier 31. The heating resistor 20, which is in good thermal contact with the measuring resistor 17, is thus brought to an overtemperature that is far above the temperature of the flowing air. If the air quantity flowing past the measuring element 1 then changes, then because of the altered convective heat transfer the temperature of the measuring resistor 17 changes as well, and the Wheatstone bridge circuit is mistuned. The control amplifier 31 thereupon varies the output current for the heating resistor 20. Via the closed control loop, changes in the measuring resistor 17 resulting from an outflowing or inflowing quantity of heat are thus always compensated for by changes in the heating capacity of the heating resistor 20, so that the measuring resistor 17 is always kept to a certain temperature. The heating current or the output voltage UA of the control amplifier 31 is thus a measure of the flow rate of the air flowing through it. Temperature fluctuations of the flowing air are compensated for by the incorporation of the temperature sensor 15 and the compensation resistor 16.

If the flow toward the substrate 3 is in the direction of the arrow 2, then the medium first strikes the leading face 4, which points upstream. In this region, disturbance from the oncoming flow develops, in the form of vortices, so that the filaments of the flow do not follow the contour of the measuring element 1. The oncoming flow disturbances fade again after a short distance. The flow presses against the surface of the measuring element 1 and in the ensuing region is virtually disturbance-free. Beyond a characteristic speed, a detachment region in the form of a Karman vortex street forms downstream of the trailing face 5, pointing downstream and located between the edges 37 and 38 of the substrate 3; the effect of the Karman vortex street is a periodic detachment of vortices 35, 36 at the edges 37, 38 of the trailing face 5; the phase relationship of the vortices 35, 36 is offset from one another by 180°; that is, the detachment of the vortices 35, 36 takes place in alternation, for instance first at the edge 37 and then at the edge 38. Because of the negative pressure prevailing in the vortices 35, 36, an oscillating fluid flow 39 develops in the direction of the negative pressure regions; depending on the location of the vortices 35, 36, this fluid flow is alternatingly in the direction of the edge 37 or of the edge 38, and in particular it affects the flow conditions in the region of the measuring resistor 17. Because of this local disturbance, the convective heat transfer in the region of the measuring resistor 17 also changes, resulting in an adulteration of the measurement values.

Figure 2:
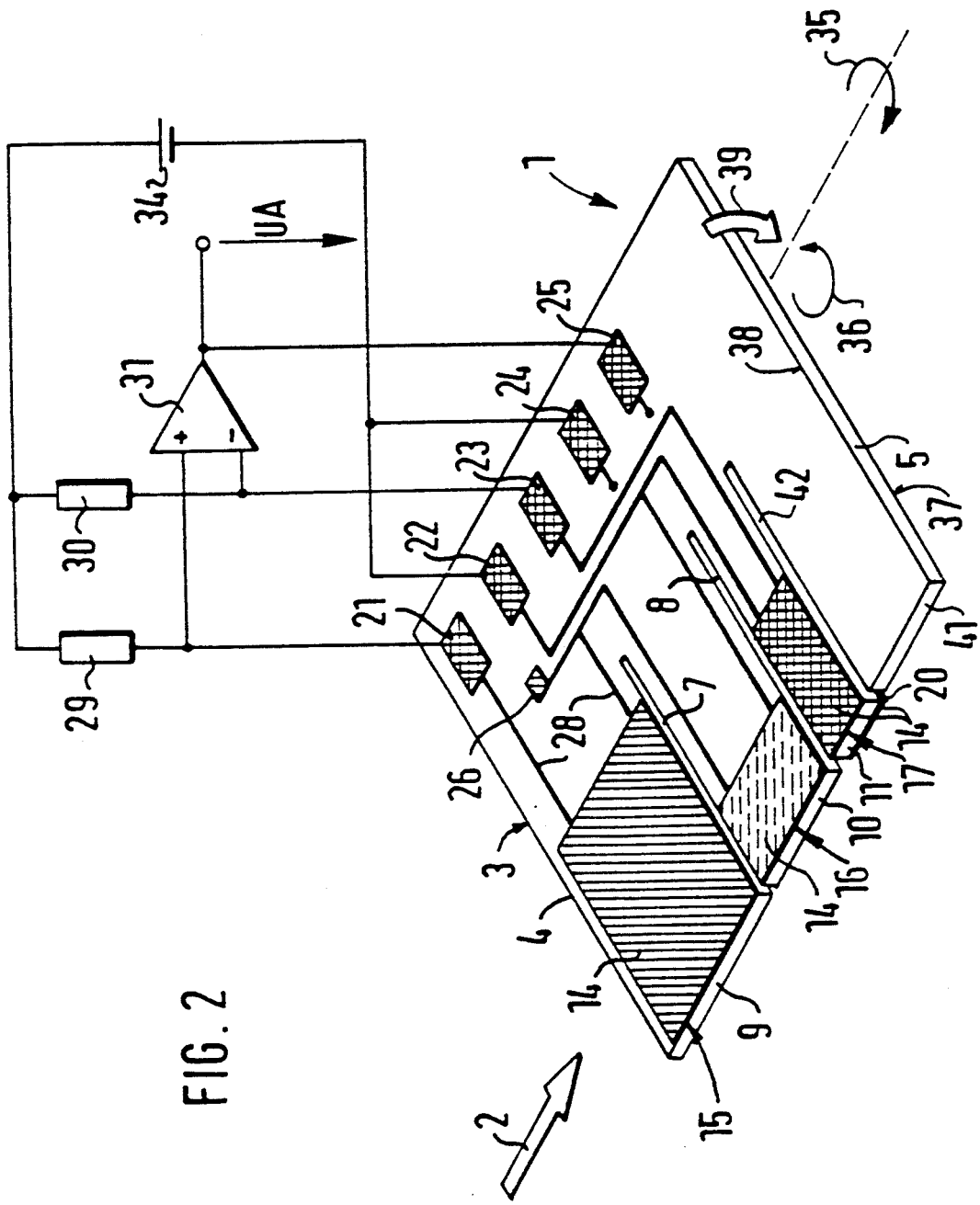
FIG. 2 shows a measuring element embodied according to the invention.

FIG. 2 shows a measuring element embodied according to the invention. Compared with the exemplary embodiment of FIG. 1, components that are the same and function the same are identified by the same reference numerals. In addition to the three prongs 9, 10, 11 with the resistor tracks 14 shown in FIG. 1, a measuring element lengthening in the form of a fourth finger 41 is provided downstream of the prong 11 that has the measuring resistor 17; this fourth prong has no resistor tracks and is separated from the third prong 11 by a slit 42 that extends parallel to the slits 7, 8. As a result of this arrangement, the trailing face 5 is farther from the measuring resistor 17, by the width of the prong 41.

Because the trailing face 5 is lengthened downstream, the disturbing vortices 35, 36 no longer develop directly downstream of the measuring resistor 17, but rather downstream of the fourth prong 41. The flow in the vicinity of the measuring resistor 17 thus remains virtually disturbance-free.

The foregoing relates to a preferred exemplary embodiment of the invention, it being understood that other variants and embodiments thereof are possible within the spirit and scope of the invention, the latter being defined by the appended claim.

What is claimed and desired to be secured by Letters Patent of the United States is:

1. A measuring element for a device for determining a flow rate of a flowing medium, having a substrate, at least one temperature-dependent resistor track carried by said substrate and exposed to the flowing medium and serving as a measuring resistor (17) which measures the flow rate of the flowing medium, downstream of the measuring resistor (17), the substrate (3) has a slit (42), extending crosswise to the flow direction, which delimits a prong (11) of the substrate (3) that has the measuring resistor (17) applied thereon, and a further prong (41) which is free of any resistor thereon which forms a medium flow detachment zone.

2. A measuring element as defined in claim 1, in which said substrate includes a plurality of slits each of which extend across the flowing medium and form first, second, third and fourth prongs, and each said first, second and third prong has at least one resistor thereon, the number of resistors being equal to the number of prongs with two resistors carried by said third prong (11).

3. A measuring element as defined by claim 2, wherein the fourth prong is downstream of the first, second and third prongs which have resistors thereon.

* * * * *